ACOUSTIC WELL LOGGING SYSTEM

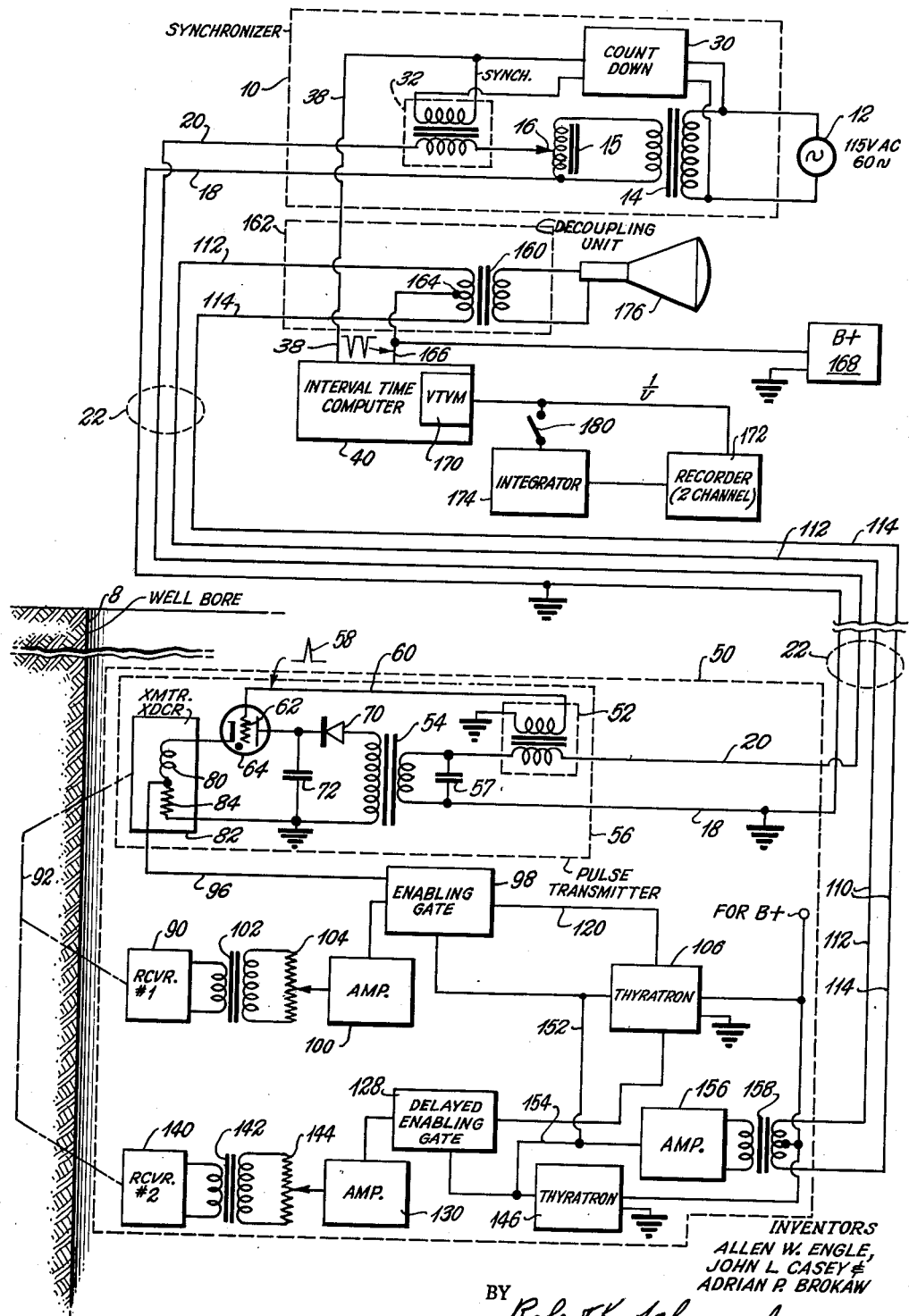

Allen W. Engle, John L. Casey, and Adrian P. Brokaw, Tulsa, Okla., assignors, by mesne assignments, to Dresser Industries, Inc., Dallas, Tex., a corporation of Delaware Filed Jan. 16, 1959, Ser. No. 787,292
3 Claims. (Cl. 340—18)

This invention relates to acoustic well logging systems for measuring the transit time interval for an acoustic impulse to pass between spaced points along a well bore, and has particular reference to an improved system for measuring the time interval between electrical pulses responsive to acoustic impulses passing through adjacent portions of the well bore.

Acoustic well logging systems are concerned with determining primary physical properties of sand, clay beds, rocks, etc., known generally as rock. The acoustic properties of the rock depend on elasticity, state of aggregation, porosity, etc., and are determined by computing the time interval for a pulse of acoustic energy to pass from one point to another point in the rock.

The acoustic well logging tool used for this determination is excited by a generator on the earth's surface, and acoustic energy is propagated from the tool in all directions. As the acoustic energy passes by spaced receiver portions of the logging tool, an electrical pulse is produced by each receiver portion for transmission to indicating equipment on the earth's surface. The indicating equipment shows the time interval between the electrical pulses developed by each of the receiver portions of the tool, and from this information the physical properties of the rock can be determined.

A substantial amount of extraneous noise from external sources, such as the logging tool or the cable supporting the tool striking the side of the bore hole, is often present. This noise is known as "road noise" and introduces substantial errors into the pulse information picked up by the receiver portions of the tool. Acoustic insulations have been provided in and about the tool to impede the transmission of acoustic energy along the tool to the receiver portions and reduce road noise.

At the indicating equipment, it is conventional to utilize a sawtooth voltage generator as a time base generator for measuring the interval of time between two electrical pulses; for example, cathode ray tube oscilloscope arrangements have been used. Not only may a sawtooth voltage generator be used to compute the time interval, but any function generator developing a single-valued function may also be used.

A single-valued function in a rectilinear coordinate system is one in which there are single values for the function along the $x$ and $y$ coordinates of the system. Such a function is often referred to as a monotonically varying function. For example, a generator may be used in which a voltage is generated which monotonically varies from a predetermined initial value to a predetermined final value during a given period of time, usually determined by the interval between the electrically pulses. A circuit arrangement measuring the peak voltage attained by a monotonically increasing voltage may be used as an interval time computer.

While some computers for determining the time interval between electrical pulses use a monotonically varying function generator in which the first pulse triggers the function generator and the second pulse stops the function generator, others cause the function generator to be sampled at the time of the second pulse. The function generator, at the time it is stopped or sampled, may provide a voltage proportional to the interval of time between the two pulses.

It is, therefore, an object of the invention to provide an improved acoustic well logging system for measuring the transit time of an acoustic pulse passing between selected spaced points along the formation surrounding a well bore.

A further object is to provide an acoustic well logging system in which the receiver elements are rendered operable only during intervals in which information pulses are to be received.

Another object is to provide an acoustic well logging system in which extraneous acoustic impulses have substantially no effect on the accuracy of the system.

In accordance with the present invention electrical power is sent down a well logging cable together with a trigger pulse. An acoustic well logging tool is suspended at the lower end of the cable, and acoustic energy is generated in a transmitter element in the tool by the electrical power in response to the trigger pulse. A pair of spaced receiver elements in the tool are actuated by the acoustic impulses generated by the transmitter and send electrical pulses to the earth's surface where the time interval between the electrical impulses is computed. From this information the characteristics of the well bore formation can be determined.

The above and other objects and advantages of the invention will become apparent from the following detailed description and accompanying drawing in which:

The FIGURE diagrammatically illustrates an acoustic well logging system which embodies the present invention.

Referring now to the drawing, there is shown an acoustic well logging system wherein a synchronizer 10 is provided with a conventional A.C. power source 12 which may have a frequency of 60 cycles per second. Within the synchronizer the power source is coupled to a transformer 14. The output of the transformer is connected to an autotransformer 15 provided with a slide connection 16 which couples the output energy to the exterior shield 18 and inner conductor 20 of an acoustic well logging cable 22. The cable, as conventionally used, is lowered into a well bore 8 over a measuring pulley (not shown).

The synchronizer 10 further includes a frequency divider, scaler, count-down circuit 30, or the like, which is coupled to the power source side of the transformer 14. The count-down circuit uses the power frequency current to derive a "sync" or trigger pulse at a submultiple of the frequency of the power source; for example, the pulse repetition rate may be 15 pulses per second (p.p.s.). The output of tht count-down circuit is coupled to a pulse transformer 32 having its output serially coupled with the output of the transformer 15. Thus, the pulse transformer superposes the trigger pulses upon the voltage supplied to the acoustic well logging cable 22 by transformer 15.

Tht output of the count-down circuit 30 is also coupled to provide the trigger pulse over a conductor 38 to an interval time computer 40 for the purpose of enabling the computer to function only after receiving the trigger pulse. The computer will be described in further detail below.

The acoustic well logging cable 22 is connected at its lower extremity to an acoustic well logging tool 50. The shield 18 and conductor 20 couple the power and the trigger pulse superposed thereon to a pulse transformer 52 serially connected to the input of a step-up transformer 54 in an acoustic pulse transmitter 56.

A capacitance 57 may be connected across the input of the step-up transformer 54 in order to by-pass the trigger pulse, and prevent transients from being reflected from the transmitter 56 into the cable 22.

The output of the pulse transformer provides a pulse 58 over a conductor 60 to the control grid 62 of a cold cathode switch tube 64, adaptable to operate efficiently while subjected to the temperatures of bore hole conditions. The range of bore hole temperatures may extend to approximately 350° F.

The output of the step-up transformer 54 is coupled through a rectifier 70 to a charging capacitor 72. Thus, when using a power frequency of 60 c.p.s. and a trigger pulse of 15 p.p.s., four cycles of the power frequency are used to charge the capacitor 72. This results in charging the capacitor between trigger pulses 58 to a predetermined voltage.

Across the capacitance 72 are serially connected the anode and cathode of the switch tube 64, an energizing winding 80 of a transmitting transducer 82, and a resistance 84. When a trigger pulse 58 is impressed upon the control grid 62 of the switch tube 64 to render the tube conductive, capacitance 72 discharges through the tube, the winding 80 and resistance 84.

The transmitter transducer 82 is of any magnetostrictive type, but preferably is a toroidally wound scroll (not illustrated) of Vanadium Permendur, a commercial product of Allegheny Ludlum Steel Corporation. The product consists of approximately 49% of cobalt, 49% of iron, and 2% of vanadium. Vanadium is used to lend workability to the product so that it may be formed into a scroll, or other convenient form for the transmitter transducer.

As capacitance 72 is discharged into the winding 80, the magnetostrictive scroll of the transmitting transducer 82 sends a pulse of acoustic energy from the tool 50. Some of the acoustic energy is picked up by a receiving transducer 90 after passing along a path 92 through the formations.

There is a mechanical spacing between the transmitting transducer 82 and the receiving transducer 90 of, for example, 4 feet. If it is determined that the greatest velocity with which acoustic energy may traverse the formations in the well bore between the 4-foot spacing is, for example, 25,000 feet/sec., then the shortest time interval necessary for acoustic energy to pass from the transmitting transducer to the receiving transducer is 160 μsecs. In order to achieve uniformity of language in expressing the shortest time for acoustic energy to traverse a unit distance, the term, μsec./ft. (micro-seconds per foot) is used. In this instance of acoustic velocity, the value for a 4-foot spacing is 40 μsec./ft.

While the acoustic energy is being generated in the transmitting transducer 82 for traversing the path 92, there is developed across the resistance 84, a signal pulse which is coupled over a connector 96 to a delayed opening coincidence gate 98 also known as a delayed enabling gate. The signal pulse passing through the enabling gate is delayed a predetermined time of 40 μsec./ft. or 160 μsec. for the 4-foot spacing.

After the delay of the predetermined time, the enabling gate 98 opens so that the output from an amplifier 100 may pass through.

When the acoustic energy travelling along path 92 is received by receiving transducer 90, an electrical pulse is produced and coupled by a transformer 102 and a tapped resistor 104 to the amplifier 100. The electrical pulse from the amplifier 100 is coupled through enabling gate 98 to a thyratron 106, thence to the cable 22. The thyratron 106 provides the electrical pulse with sufficient amplitude to traverse the cable to the earth's surface. A pulse output from the thyratron 106 is coupled over a conductor 120 to return the enabling gate 98 to its original condition. In its original condition of stability, the enabling gate is ready for the next signal pulse that may be transmitted by the transmitting transducer 82.

Another pulse output from the thyratron 106 is coupled to a second delayed enabling gate 128 so that the output of the amplifier 130 may pass through the delayed enabling gate. The delay characteristic of the enabling gate is predetermined by its electrical parameters and is equal to or less than the time interval required for the greatest velocity with which acoustic energy may traverse the well bore formations from adjacent the receiving transducer 90 to adjacent a receiving transducer 140.

If the mechanical spacing between receiving transducers 90 and 140 is, for example, 3 feet, then the shortest time for acoustic energy to traverse the mechanical spacing of 3 feet is 120 μsec. This assumes that the greatest velocity for the acoustic energy traversing the well bore formations is 25,000 feet per second.

When the acoustic energy generated in the transmitting transducer continues beyond the formations adjacent the receiving transducer 90, and is received by the receiving transducer 140, an electrical signal is produced therein. The electrical signal is coupled by a transformer 142 and a tapped resistor 144 through the opened amplifier 130.

The electrical pulse passing through the amplifier 130 and the enabling gate 128 is connected to a grid of a thyratron 146.

When it is desired to send to the earth's surface complete information concerning the received acoustic energy produced in the receiving transducers, either or both of connections 152, 154 are used to couple the electrical signal to an amplifier 156.

The electrical signal, without being shaped by the action of the thyratrons 106, 146 or other circuit device, is useful for presentation upon an oscilloscope 176 at the earth's surface. A typical oscillogram of the received electrical pulse is often known as the "formation signature." As pointed out in "Continuous Velocity Logging," by G. C. Summers and R. A. Broding, Geophysics, Vol. XVII, No. 3 (July 1952) at pages 602 and 603, the velocity is great enough so that the separation of the received energy into three major components is apparent. The formation component, having a frequency of about eleven kilocycles, has travelled at formation bulk velocity. The second arrival, composed of much high frequency energy, has travelled at a velocity of about 5,000 feet per second. This has been tentatively identified as the bulk compressional velocity of the drilling fluid. The third major component, composed of lower frequency energy, has travelled at a velocity of about 3,700 feet per second and relates to the velocity of a wave in a tube affected by the elasticity or shear modulus of the wall.

The "formation signature" having its gain increased by amplifier 156 is coupled to conductors 112, 114 of a balanced line 110 by the transformer 158. The balanced line 110 is used to transmit the output pulses of thyratrons 106, 146 in a phantom configuration, in which the circuit is completed by cable shield 18. In such an arrangement, the pulses are applied to the center-tap of the secondary of transformer 158. There follows a description of this "phantom configuration" and its simultaneous use for the transmission of direct current.

At the earth's surface the conductors 112, 114 of the balanced line 110 are coupled to a balanced transformer arrangement 160 in a decoupling unit 162. From a center-tap connection 164 of the transformer arrangement, a connection 166 is provided to couple the electrical pulses on the balanced line from the thyratrons 106, 146 to the interval time computer 40. The circuit for these pulses is completed through cable shield 18. Current from the filtered D.C. potential source 168 is sent over the conductors 112, 114 of the balanced line 110 which are effectively connected in parallel for currents applied and removed at center-tap 164 and the center-tap of the secondary of transformer 158 with a return path through the cable shield 18 from the tool 50. This circuit configuration where the conductors of a balanced line are effectively connected in parallel is generally known as a phantom circuit.

As described above the interval time computer 40 receives the trigger pulse on conductor 38 to enable it to function. After the trigger pulse is received, the computer is set to receive pulses from the balanced line 110 over connection 166.

When the electrical pulse received by the computer indicates the arrival of acoustic energy at the receiving transducer 90, the computer initiates the generation of a monotonic function. The instantaneous value of the monotonic function increases until the electrical pulse received by the computer 40 indicates the arrival of acoustic energy at the receiving transducer 140. At that instant the increase of the instantaneous value of the monotonic function ceases, and the peak value is coupled to a vacuum tube voltmeter 170, the output of which is applied to a recorder 172.

If it is desired to record on the recorder 172 integrated values of the interval time computed in analog terms by the peak values of the monotonic function, then these values are passed through an integrator 174 prior to being coupled to the recorder by changing the position of a switch 180.

A cathode ray oscilloscope 176 is provided to display the electrical representation of the formation signature that is coupled from the amplifier 156 to the transformer arrangement 160 by the balanced line 110.

One of the advantages of the improved acoustic well logging tool and system is that the receiving channels in the logging tool are enabled by trigger pulses for operation only when it is imminent that acoustic energy is to be received by the respective receiving transducer. Also, the interval time computer signal channel is disabled until a sync pulse is received by the computer, which, after a period of time delay, enables the computer to determine the interval of time between electrical pulses developed in the tool.

It should be understood that the specific apparatus or system shown and described herein is intended to be representative only. Reference should therefore be made to the following claims in determining the full scope of the invention.

What is claimed is:

1. A system for measuring the velocity of acoustic energy traversing sub-surface earth formations, said system comprising: means for providing A.C. energy; an electric pulse generator providing, and superposing on said A.C. energy, first electric pulses at a fixed repetitive rate that is a sub-multiple of the frequency of said A.C. energy and that establishes between each of said first pulses at least a pre-determined amount of said A.C. energy of a given polarity; an acoustic well logging tool interconnected remotely of said means and said pulse generator to receive said A.C. energy and superposed first pulses, said tool comprising an acoustic energy transmitter enabled by each of said first pulses to transduce said amount of A.C. energy simultaneously into an acoustic energy pulse and a second electric pulse, and a plurality of acoustic energy receivers enabled by said second electric pulse to transduce received acoustic energy into a respective plurality of electrical signals during a predetermined time interval; and a computer interconnected remotely of said tool and enabled by each of said first pulses to measure the time interval between related ones of said signals during a pre-determined time interval.

2. A system for measuring the velocity of acoustic energy traversing subsurface earth formations, said system comprising: means for providing a continuous flow of A.C. energy; an electric pulse generator providing, and superposing on said A.C. energy, first electric pulses at a fixed repetitive rate such that said first pulses are commonly located with respect to polarity of undulation of said A.C. energy and such that at least a pre-determined amount of said A.C. energy of one polarity is provided between each of said first pulses; an acoustic well logging tool interconnected remotely of said means and said pulse generator in a manner to receive said A.C. energy and said superposed first pulses, said tool comprising an acoustic energy transmitter so arranged and adapted when enabled by each of said first pulses to transduce said amount simultaneously into an acoustic energy pulse and a second electric pulse, a first acoustic energy transducer spaced a first distance from said transmitter, a second acoustic energy transducer spaced from said transmitter and said first transducer a pre-determined distance from said first transducer, a first enabling means interconnected with said first transducer and said transmitter and adapted to enable said first transducer after a pre-determined first time interval to transduce received acoustic energy into a primary electric signal during a pre-determined second time interval, and a second enabling means interconnected with said first enabling means and said second transducer and adapted to enable said second transducer after a predetermined third time interval to transduce received acoustic energy into a secondary electric signal during a pre-determined fourth time interval; and a computer arranged and adapted to receive said first pulses from said pulse generator and enabled by each of said pulses after a predetermined fifth time interval to receive and to measure the time interval between said primary and secondary signals.

3. A system for measuring the velocity of acoustic energy traversing sub-surface earth formations, said system comprising: means for providing A.C. energy; an electric pulse generator providing, and superposing on said A.C. energy, first electric pulses at a fixed repetitive rate that is a sub-multiple of the frequency of said A.C. energy and that establishes between each of said first pulses at least a predetermined amount of said A.C. energy of a given polarity; an acoustic well logging tool interconnected remotely of said means and said pulse generator to receive said A.C. energy and superposed first pulses, said tool comprising an acoustic energy transmitter enabled by each of said first pulses to transduce said amount of A.C. energy simultaneously into an acoustic energy pulse and a second electric pulse, and a plurality of acoustic energy receivers enabled by said second electric pulse to transduce received acoustic energy into a respective plurality of electrical signals during a predetermined first time interval; and a computer interconnected remotely of said tool to measure the time interval between related ones of said electrical signals.

References Cited in the file of this patent
UNITED STATES PATENTS

| | | |
|---|---|---|
| 2,691,422 | Summers et al. | Oct. 12, 1954 |
| 2,708,485 | Vogel | May 17, 1955 |
| 2,737,639 | Summers et al. | Mar. 6, 1956 |
| 2,857,011 | Summers | Oct. 21, 1958 |
| 2,931,455 | Loofbourrow | Apr. 5, 1960 |
| 2,938,592 | Charske et al. | May 31, 1960 |
| 2,949,973 | Broding et al. | Aug. 23, 1960 |